United States Patent
Browne

(10) Patent No.: US 9,618,746 B2
(45) Date of Patent: Apr. 11, 2017

(54) HIGH RESOLUTION WIDE FIELD OF VIEW DIGITAL NIGHT VISION SYSTEM

(75) Inventor: Michael P. Browne, San Mateo, CA (US)

(73) Assignee: SA Photonics, Inc., Los Gatos, CA (US)

( * ) Notice: Subject to any disclaimer, the term of this patent is extended or adjusted under 35 U.S.C. 154(b) by 459 days.

(21) Appl. No.: 12/950,116

(22) Filed: Nov. 19, 2010

(65) Prior Publication Data

US 2012/0257005 A1    Oct. 11, 2012

(51) Int. Cl.
*H04N 5/00* (2011.01)
*G02B 27/01* (2006.01)
(Continued)

(52) U.S. Cl.
CPC ...... *G02B 27/017* (2013.01); *G02B 2027/011* (2013.01); *G02B 2027/014* (2013.01);
(Continued)

(58) Field of Classification Search
CPC ............ G02B 27/017; G02B 2027/014; G02B 2027/0123; G02B 2027/011; G02B 2027/0138; G02B 27/0138; G02B 23/00; G02B 23/12; G02B 27/01; G02B 23/125; G02B 27/0176; H04N 5/2258; H04N 5/23238; H04N 5/33; H04N 7/00; H04N 5/225; H04N 9/09; H04N 9/093; H04N 5/2624; G06K 9/32; G06K 9/36; G06T 3/4061; G06T 2207/20221; G06T 5/50
(Continued)

(56) References Cited

U.S. PATENT DOCUMENTS 3,410,629 A    11/1968  Carpenter et al.
4,698,857 A  * 10/1987  Kastendieck et al. ............ 2/426
(Continued)

FOREIGN PATENT DOCUMENTS

JP    2010-145674    7/2010

OTHER PUBLICATIONS

Wilburn, PhD thesis, "High Performance Imaging Using Arrays of Inexpensive Cameras", A Dissertation Submitted to the Department of Electrical Engineering and the Committee on Graduate Studies of Stanford University in Partial Fulfillment of the Requirements for the Degree of Doctor of Philosophy; 2004.*
(Continued)

*Primary Examiner* — Frank Huang
(74) *Attorney, Agent, or Firm* — Knobbe Martens Olson & Bear LLP

(57) ABSTRACT

A wide field of view night vision system includes a head attachment apparatus configured to attach to a user's head and a night vision subsystem. The night vision subsystem includes one or more digital night vision image sensors attached to the head attachment apparatus. Each sensor receives input light and produces a digital image of the input light. A processor processes the digital image(s) to produce a wide-field image. The wide-field image spans at least 60 degrees of a user's horizontal field of view. A display and eyepiece attached to the head attachment apparatus receives and displays the wide-field image. The eyepiece is positionable between the display and the user's eye to image the wide-field image into the user's eye.

22 Claims, 4 Drawing Sheets

(51) Int. Cl.
  *H04N 5/225* (2006.01)
  *H04N 5/232* (2006.01)
  *H04N 5/33* (2006.01)

(52) U.S. Cl.
  CPC ............... *G02B 2027/0123* (2013.01); *G02B 2027/0138* (2013.01); *H04N 5/2258* (2013.01); *H04N 5/23238* (2013.01); *H04N 5/33* (2013.01)

(58) Field of Classification Search
  USPC .......... 348/36, 53, 113, 216.1, 217.1, 218.1, 348/223.1, 208.2, 143; 359/353, 629, 359/630, 634, 631; 2/426
  See application file for complete search history.

(56) References Cited

U.S. PATENT DOCUMENTS

| | | | |
|---|---|---|---|
| 5,473,365 A | 12/1995 | Okamura | |
| 5,572,343 A | 11/1996 | Okamura et al. | |
| 5,726,807 A | 3/1998 | Nakaoka et al. | |
| 6,075,644 A | 6/2000 | Filipovich | |
| 6,201,641 B1 | 3/2001 | Filipovich | |
| 6,407,724 B2 | 6/2002 | Waldern et al. | |
| 6,462,894 B1 | 10/2002 | Moody | |
| 6,560,029 B1* | 5/2003 | Dobbie et al. | 359/631 |
| 6,653,989 B2 | 11/2003 | Nakanishi | |
| 6,757,008 B1* | 6/2004 | Smith | 348/143 |
| 7,072,107 B2 | 7/2006 | Filipovich et al. | |
| 7,158,296 B1 | 1/2007 | Schwartz, II et al. | |
| 7,289,272 B2 | 10/2007 | Bowron et al. | |
| 7,307,793 B2 | 12/2007 | Ottney et al. | |
| 7,381,952 B2 | 6/2008 | Teich et al. | |
| 7,806,533 B2 | 10/2010 | Boute et al. | |
| 8,736,967 B1 | 5/2014 | Browne et al. | |
| 8,817,196 B2 | 8/2014 | De La Tocnaye et al. | |
| 2003/0129567 A1 | 7/2003 | Cabato et al. | |
| 2003/0231804 A1* | 12/2003 | Bacarella et al. | 382/284 |
| 2004/0227703 A1 | 11/2004 | Lamvik et al. | |
| 2005/0046702 A1* | 3/2005 | Katayama et al. | 348/222.1 |
| 2008/0136923 A1* | 6/2008 | Inbar et al. | 348/208.2 |
| 2008/0170119 A1* | 7/2008 | McCann | 348/113 |
| 2008/0309774 A1* | 12/2008 | Beng Goh et al. | 348/218.1 |
| 2009/0051760 A1* | 2/2009 | Ottney | 348/53 |
| 2009/0251680 A1 | 10/2009 | Farsaie | |
| 2010/0128135 A1* | 5/2010 | Filipovich et al. | 348/217.1 |
| 2012/0002064 A9* | 1/2012 | Filipovich et al. | 348/217.1 |
| 2012/0119978 A1 | 5/2012 | Border et al. | |
| 2012/0182326 A1 | 7/2012 | Moore | |
| 2012/0257005 A1 | 10/2012 | Browne | |
| 2013/0234935 A1 | 9/2013 | Griffith | |

OTHER PUBLICATIONS

Moore, S.A., "Anamorphic Eyepiece for Increased Field of View," International Optical Design Conference (IODC), Jun. 13, 2010, Jackson Hole, WY, 5 pages.

* cited by examiner

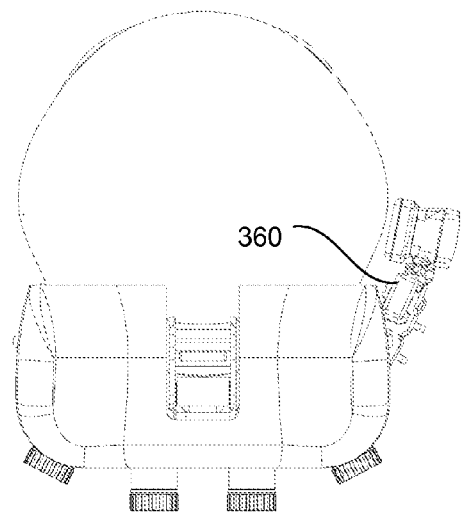
FIG. 4b
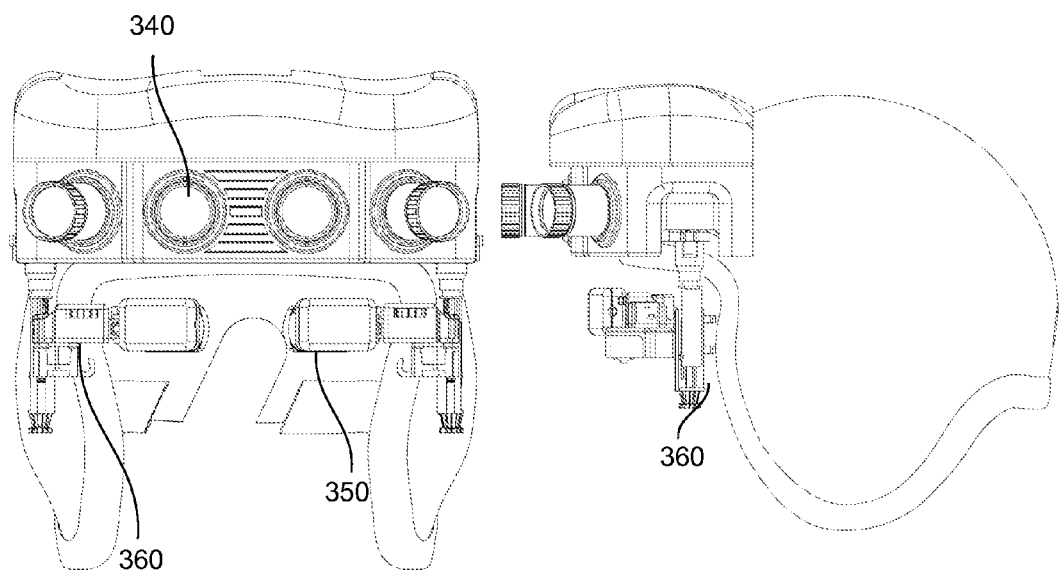
FIG. 4a     FIG. 4c

HIGH RESOLUTION WIDE FIELD OF VIEW DIGITAL NIGHT VISION SYSTEM

GOVERNMENT RIGHTS LEGEND

This invention was made with government support under Phase I SBIR Government contract FA8650-08-M-6892 and Phase II SBIR Government contract FA8650-09-C-6018 awarded by the United States Air Force. The government has certain rights in the invention.

BACKGROUND

1. Field of Art

This invention generally relates to the field of night vision systems, particularly to head or helmet mounted night vision systems.

2. Description of the Related Art

A night vision system improves the ability of a user to see in an environment where small amounts of light are present. Existing night vision systems take in low levels of ambient light not viewable to the naked eye and amplify it to viewable levels using image intensifier tubes. An image intensifier tube functions by amplifying the number of received photons while keeping the resulting photons spatially separated so that the original image formed by the ambient light is not distorted or blurred. The downside of image intensifier tubes, however, is that they are bulky and they are analog sensors. Existing night vision systems have a number of limitations caused by the physical characteristics of image intensifier tubes.

For example, existing night vision systems have large forward projection and have forward centers of gravity, which reduces their usability. In particular, pilots using existing systems have a restricted range of motion for their head and the forward center of gravity induces neck fatigue and is unsafe for ejection. When performing high gravity turns, the weight of the night vision system is multiplied by the g-loading generated by the turn. That weight is borne by the pilot in the head and neck area. A non-neutral center of gravity serves to magnify the weight felt by the pilot while in the turn, which causes the night vision system to move and may result in injury to the pilot.

Existing night vision systems typically also have a limited field of view, often around 40 degrees in both the horizontal and vertical directions. Increasing the field of view typically would require the use of multiple image intensifier tubes. The additional image intensifier tubes multiply the engineering constraints (including weight, space and power) of the system, along with any problems caused by those constraints. Further, they can introduce distortion in the night vision image viewed by the user at the boundary between the outputs of adjacent tubes. There is currently no way to remove the distortion in these systems.

SUMMARY

The present invention overcomes the limitations of the prior art by providing a wide field of view digital night vision system. The night vision system uses digital sensors in place of image intensifier tubes. The digital sensors output electronic images rather than amplified light, thereby reducing the engineering constraints of the system and allowing for features not present in existing night vision systems.

In one embodiment, the night vision system includes a head attachment apparatus configured to attach to a user's head, and a night vision subsystem. The night vision subsystem comprises one or more night vision image sensors attached to the head attachment apparatus. Each sensor receives low intensity ambient input light comprising at least one band of wavelengths in the visible to near infrared range, and produces a digital image of the input light. A processor receives the digital image(s) from the digital night vision image sensor(s) in order to process the digital image (s) to produce a wide-field image. The wide-field image spans at least 60 degrees of the user's horizontal field of view. A display and eyepiece attached to the head attachment apparatus receives and displays the wide-field image. The image of the surroundings produced by the night vision system is located in the same position within the user's field of view as the actual surroundings. The eyepiece is positionable between the display and the user's eye to image the wide-field image into the user's eye.

In one embodiment, the head attachment apparatus comprises a helmet and an adjustable arm attached to the helmet. The adjustable arm holds the display and eyepiece. The adjustable arm is moveable to (a) a first position where the display and eyepiece are out of the user's line of sight so that the system does not significantly obstruct the user's vision, and (b) a second position where the display and eyepiece are in the user's line of sight so that the wide-field image is imaged into the user's eye.

In one embodiment, the night vision system comprises at least two night vision image sensors, each producing a digital image of the user's field of view. The night vision image sensors are positioned with respect to each other (e.g., horizontally offset and/or angled) such that the digital images are horizontally offset but with some overlap. The processor receives the digital images from the digital night vision image sensors and processes the digital images to produce the wide-field image.

In one embodiment, the night vision system comprises a second display and eyepiece attached to the head attachment apparatus. The processor processes the digital images to produce a left eye wide-field image and a right-eye wide field image, each wide-field image spanning at least 50 degrees (or at least 45 degrees) of a user's horizontal field of view and the total system spanning at least 60 degrees, with each eyepiece/display independently positionable with respect to the user's right or left eye, to image the corresponding wide-field image into the user's eye.

Other aspects of the invention include devices and applications for the system described above, and methods corresponding to all of the foregoing.

BRIEF DESCRIPTION OF DRAWINGS

FIG. 4a is a front view of a high resolution wide field of view digital night vision system.

FIG. 4b is a top view of a high resolution wide field of view digital night vision system.

FIG. 4c is a side view of a high resolution wide field of view digital night vision system.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
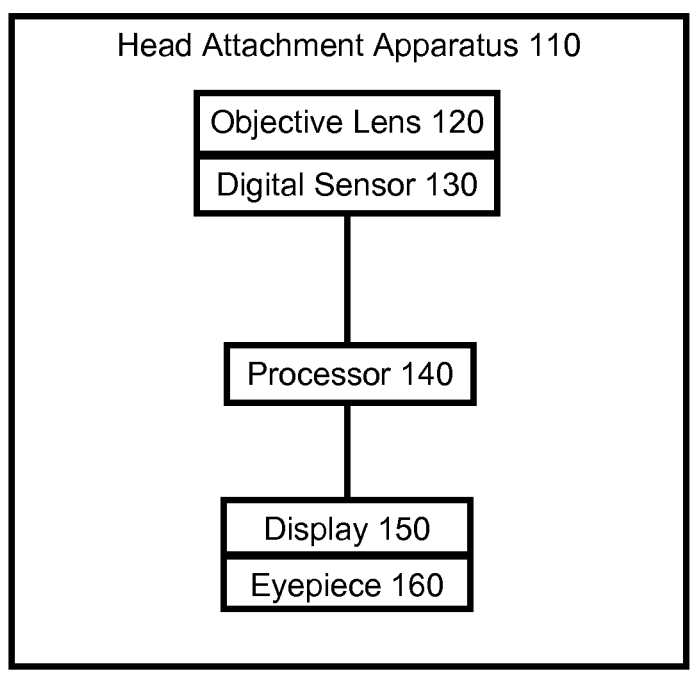
FIG. 1 is a system diagram of a high resolution wide field of view digital night vision system.

FIG. 1 is a system diagram of a night vision system. The night vision system 100 comprises a head attachment apparatus 110, an objective lens 120, a digital sensor 120, a processor 140, a display 150, and an eyepiece 160.

The night vision system 100 receives as input low intensity ambient light from the surroundings in the field of view of the night vision system 100 through the objective lens 120 into the digital sensor 130. The digital sensor 130 amplifies the low intensity ambient input light and outputs a digital image of the surroundings. The digital image is in an electrical format, and can be manipulated, stored, and transmitted by electronic devices such as the processor 140. The digital image is passed from the digital sensor 130 to the processor 140, which processes it to form a wide-field of view image. In one embodiment, there are multiple digital sensors 130 and the processor 140 stitches together the digital images from multiple digital sensors 130 to form a wide-field of view image, still in digital format. The processor 140 sends the resulting wide-field image to a display 150 which, via the eyepiece 160, images the wide-field image into the user's eyes. The eyepiece 160 may correct the aspect ratio of the wide-field image so that it appears at the same aspect ratio as the original surroundings. The image of the surroundings produced by the night vision system 100 is located in the same position within the user's field of view as the actual surroundings.

Depending upon the embodiment, the night vision system 100 may comprise more than one objective lens, digital sensor, processor, display, and/or eyepiece. Particularly, if the night vision system comprises at least two objective lenses, at least two digital sensors, two displays and two eyepieces, the night vision system is capable of providing depth perception to the user. Additionally, the number of digital sensors and objective lenses will affect the width of the field of view and resolution of the night vision system. All other things equal, the greater the number of objective lenses and digital sensors present, the wider the field of view and the higher the resolution of the night vision system.

The head attachment apparatus 110 keeps the night vision system 100 securely fastened to the user's head. Different embodiments of the night vision system may make use of different head attachment mechanisms, in order to suit the purposes of the user. For example, in one embodiment the head attachment apparatus 110 may comprise a helmet. In contrast, in other embodiments the head attachment apparatus 110 may be a banana clip mount, simple screw, or any other platform for affixing the head attachment apparatus 110 to something else that is attached to the user's head.

Objective lens 120 receives low intensity ambient input light from the environment in front of the night vision system, and focuses the incoming light to image it on the digital sensor 130. The objective lens may also serve to filter the wavelength of the incoming radiation for a number of purposes, including night vision lighting compatibility. The objective lens may be made of several different materials including, for example, glass or plastic.

The digital sensor 130 receives the input light from the objective lens 120. The input light is converted by the digital sensor 130 into a digital image. The digital sensor 130 stores a digital version of the original image using spatially separated units (pixels). Together, the pixels collectively spatially map the input light and the image formed by the input light into an electrical data format. In some embodiments, the pixel data additionally comprises wavelength information from the input light which, depending upon the embodiment, may be used to add color or false color to the digital image.

In some embodiments instead of using digital sensors, the night vision system 100 may comprise traditional image intensifier tubes (not shown) coupled to fiber optic couplers which would then be coupled to a traditional CCD designed to receive photons that are emitted from the image intensifier tube.

Using digital sensors in place of image intensifier tubes has several benefits. Image intensifier tubes are generally five to ten times longer than the digital sensors. In addition to the length of the image intensifier tube itself, additional space is taken up by the optical path from the output of the image intensifier tube to the eyepiece in front of the user. The space requirements for these tubes is multiplied if high resolution or wide field of view functionality is desired.

In contrast to image intensifier tubes, digital sensors output an electronic digital image rather than an optical analog image. The digital image is converted back to light when it is ready to be displayed to the user. As a result, space that would otherwise be taken up by the image intensifier tube output optical path can be can be replaced by wires or digital circuits, which are significantly smaller. In some applications, this saves about three quarters of an inch of optical path space per digital sensor. It also simplifies the placement of the digital sensors, as there is no longer a requirement of an uninterrupted optical path having the diameter of the image intensifier tube and running from intensifier tube output to the eyepiece in front of the user. As a result, a night vision system that has a reduced forward projection and has an ejection safe weight and center of gravity may be constructed.

Digital sensors 130 may be constructed using several different technologies. In one embodiment, each digital sensor 130 is comprised of a photocathode, air gap, a high voltage source, and a charge coupled device (CCD) specially designed to receive accelerated electrons rather than photons. Photons are received at the front of the digital sensor by the photocathode, where they are converted to electrons. The electrons are accelerated through the air gap by the high voltage source. At the end of the air gap, the accelerated electrons slam into a charge coupled device well. As a result of the acceleration of the electrons impinging upon the CCD well, the CCD well produces more electrons than are received, wherein the number of extra electrons that is generated in the well is based on the velocity of the received electrons. The velocity of the received electrons is determined based on the voltage of the high voltage source, and is referred as the gain factor of the night vision system. The CCD well has a pixel resolution, so that the image formed by the received photons is imaged in the form of electrons inside the pixels of the CCD well. The electrons in the CCD well are then converted to a digital signal through an analog to digital converter. In one embodiment, the digital sensor 130 is an INTEVAC or FAIRCHILD digital sensor. In one embodiment, a digital sensor 130 receives input at a pixel resolution of 1600×1200, which corresponds to a 40×30 degree field of view for the given objective lens.

Night vision systems 100 are configured to operate within a specified range of wavelengths. Generally, this range of wavelengths ranges from the visible wavelengths to the near infrared wavelengths, or generally from approximately 390 nanometers (nm) to 1100 nm.

Night vision systems are generally most useful in circumstances where there the ambient light intensity is very low. As both digital sensors 130 and image intensifier tubes are designed to amplify the intensity of received ambient light, they generally do not function as well (and are not needed) in circumstances where there is a lot of ambient light. Low intensity ambient light conditions include a range of conditions, from when there is almost no ambient light up to and including full moon conditions. Night vision systems operate at low light levels, but that does not necessarily preclude their operation at higher light levels. In one embodiment, the lowest level of ambient light necessary for the night vision system to function is approximately $10^{-4}$ lux.

Each digital sensor 130 captures light within the field of view of the objective lens 120. By adjusting the design of the objective lens 120, the field of view (specifically, the angular resolution in the object space) may be adjusted. As described above, each digital sensor 130 only has a finite number of pixels into which it can capture received input light. As the field of view increases, the volume of light that will be captured by each pixel increases, reducing the ability of each pixel to capture fine details. In other words, as the field of view increases, the resolution of each pixel goes down.

In one embodiment, each objective lens 120 and digital sensor 130 combination captures a 27.5 degree horizontal view and a 30 degree vertical field of view. In other embodiments, the system may be configured so that each objective lens and digital sensor combination captures a 40 degree or greater horizontal and/or vertical field of view. The system may also be configured to captured a narrower field of view than the embodiments previously described.

By incorporating more than one digital sensor 130, a night vision system 100 can capture a wide field of view and simultaneously maintain a high resolution. The processor 140 (or microprocessor) is configured to stitch together the digital images received from multiple digital sensors in order to produce a wide-field image. Digitally stitching together images from multiple digital sensors and displaying them on a single eyepiece optic results in reduced distortion and visual anomalies compared to approaches based on combining optical images.

In one embodiment, the processor 140 stitches together multiple digital images by detecting how the digital images overlap. The processor 140 can then use the overlap between digital images in order to determine where one image ends and another begins, in order to form a wide-field image with no overlap and no lost image data.

Figure 2:
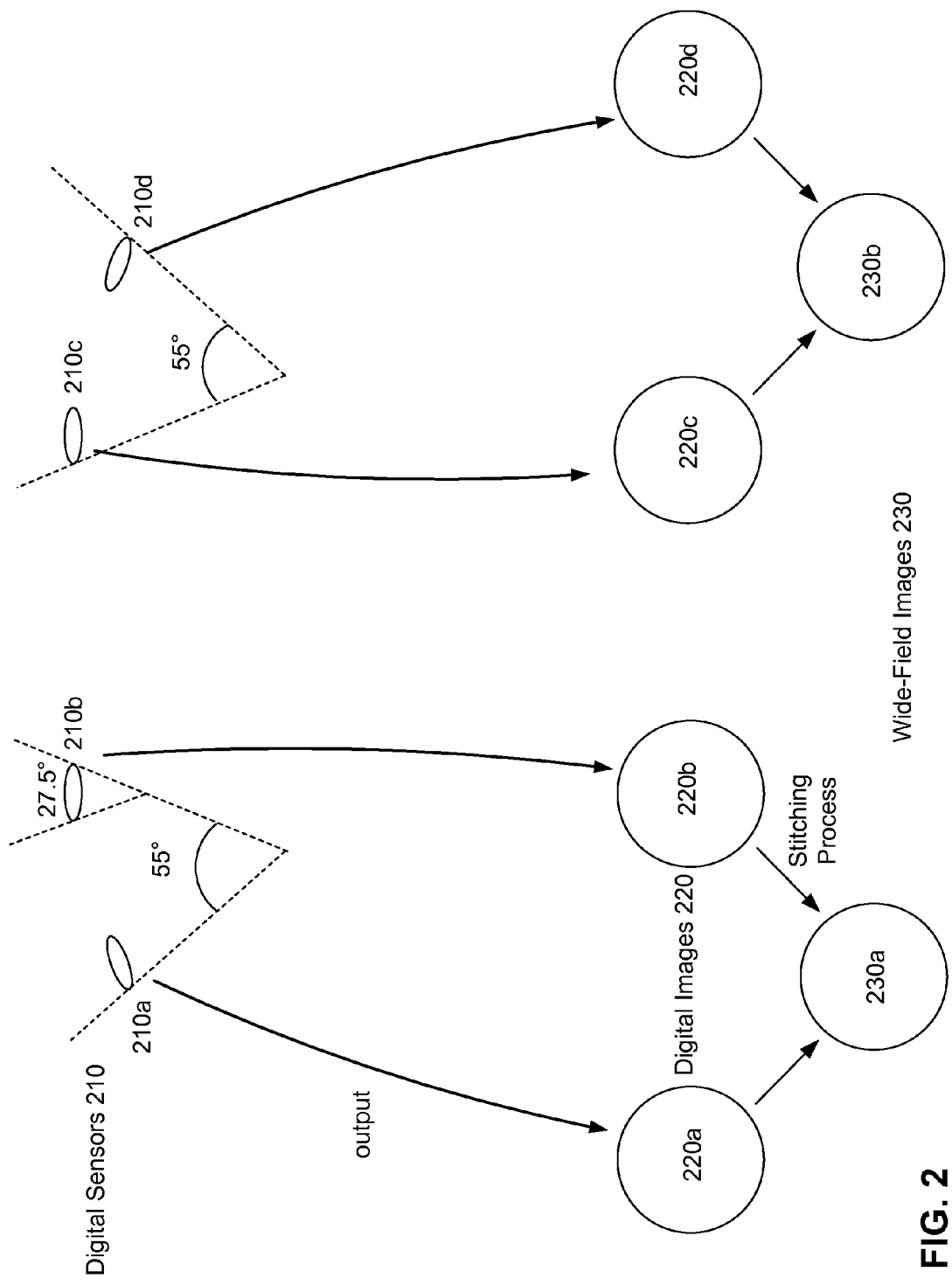
FIG. 2 illustrates a high resolution wide field of view night vision system comprising four digital sensors producing wide field of view images for the left and right eye.

FIG. 2 illustrates a high resolution wide field of view night vision system comprising four digital sensors 210a-d with output image data stitched together to provide a user with a wide field of view and depth perception. Each digital sensor 210a-d produces a corresponding digital image 220a-d. In the embodiment of FIG. 2, the night vision system 100 produces a wide-field image with an 80 degree horizontal field of view for the whole system. The four digital sensors 210 are divided into two pairs of two digital sensors each. Sensors 210a/b are the left eye pair and sensors 210c/d are the right eye pair. Within each pair of digital sensors, each digital sensor is angled away from the other and spatially offset from the other in order to increase the horizontal field of view in the captured images. Generally, at least some overlap between each digital sensor in a pair is desirable so that when the processor 140 stitches together the digital images from each digital sensor in the pair, it can create a contiguous wide-field image with no gaps. The two digital sensors on the left, 210a and 210b, provide the digital images 220a and 220b that will be stitched together to form the wide-field image 230a that will be displayed to the user's left eye. The two digital sensors on the right, 210c and 210d, provide the digital images 220c and 220d that will be stitched together to form the wide-field image 230b that will be displayed to the user's right eye.

In the example embodiment of FIG. 2, each digital sensor 210 captures a 27.5 degree field of view. Digital images 220a and 220b are stitched together to form a 55 degree field of view wide-field image. In this embodiment, the night vision system 100 has a total horizontal field of view of 82.5 degrees, with an overlap of 27.5 degrees between the two wide-field images.

In some embodiments, the processor 140 may additionally modify the wide-field image to include information that was not originally present in the input image. For example, the processor 140 may include overlaid symbology or video on top of the digital image. For example, the overlay could include text information, geo-location information, or video from a remote sensor or unmanned vehicle.

In one embodiment, the processor is attached to the head attachment apparatus 110 along with the remainder of the night vision system 100. In another embodiment, the processor is located external to the night vision system 100. For example, the processor could be part of the computer of a helicopter the user is flying with the aid of the night vision system 100 or it could be mounted in a small enclosure clipped to the user's clothing "chest pack". In one embodiment, the processor is connected to the night vision system through an input port configured to transmit data to and from the digital sensors 130 and the displays 150. Once the processor 140 has completed stitching and/or modifying the digital image to create the wide-field image, the wide-field image is passed to a display 150. The display 150 images the wide-field image into the eyes of the user of the night vision system 100. The wide-field image received by the display 150 has a pixel resolution defined by the pixel resolution of the digital sensors 130, for example 1600×1200 per digital sensor. The display 150 comprises enough pixels in order to accurately reproduce the digital image at a high resolution. In one embodiment, the display 150 has a high resolution if it has a pixel resolution of at least 3200×1200. Other pixel resolutions possible with this approach include 3840×1024, 2400×1024, 2880×1200, and 2560×1024.

Existing displays 150 are only able to reproduce approximately 1280×1024 pixels in a size that is convenient for a night vision system 100. Although display technology is expected to improve over time, thereby increasing the number of pixels in a display, it is possible to obtain the required number of pixels for a high resolution night vision system using existing display technology. Each pixel in a display 150 comprises three subpixels each of which displays a different color. Traditionally, the colors assigned to the subpixels are red, green, and blue. Each subpixel is capable of displaying its assigned color at a varying level of brightness. Changing the brightness of each subpixel changes the overall color for the pixel when the pixel is viewed at a distance. Frequently, the subpixels are vertically striped, meaning that they are three equal width vertical strips of color that three times as high as they are wide. Other subpixel layouts are possible, however.

In some embodiments, in order for the wide-field image output by the night vision system 100 to have sufficient resolution to be considered high resolution, each subpixel of the display 150 is coded as a separate pixel. Thus, each subpixel of the display is separately coded to correspond with a pixel of the digital image. In one embodiment, if the display 150 comprises 1280×1024 pixels and the subpixels are vertical striped as described above, adding subpixel coding to control each subpixel of the display as a separate pixel will result in a display resolution of 3840×1024 pixels, which is sufficient for high resolution over a wide field of view.

In the future, as the pixel count of available display technology increases, subpixel coding may become less necessary. In this case, the subpixels may again be used for their normal function, for example outputting a wide-field image of different colors. For example, if the display 150 had approximately 1920 horizontal pixels and was vertically striped as described above, subpixel coding could be used to encode every odd pixel as a first color, and every even pixel as a second color. In this embodiment, every two subpixels would represent a single pixel in the digital image. Thus, with subpixel coding the display 150 would effectively have approximately 2880 horizontal pixels, which is sufficient for high resolution, and the ability to display any combination of these two colors in the wide-field image.

The display 150 may be constructed using any technology capable of displaying a sufficient number of pixels or subpixels to produce a high resolution, wide field of view image. Examples of display technology that may be used include liquid crystal displays (LCD), liquid crystal on silicon (LCOS) displays, plasma displays, light emitting diode (LED) displays, or organic light emitting diode (OLED) displays.

The output wide-field image of the display 150 passes through an eyepiece 160 before reaching the user's eye. In embodiments making use of subpixel coding, the eyepiece 160 comprises an anamorphic eyepiece in order to correct the aspect ratio of the output wide-field image. An anamorphic eyepiece comprises lens elements that produce a different effect on light passing through the eyepiece in the horizontal and vertical directions. For example, if the display 150 is a vertically striped display such that the subpixels are three times taller than then they are wide as described above, the eyepiece 160 is anamorphic in such a manner as to reverse the change in the aspect ratio caused by the subpixel aspect ratio. The output wide-field image passing through the anamorphic eyepiece 160 will be stretched in the horizontal direction and/or shrunk vertical direction such that the wide-field image as imaged on the user's eye matches the aspect ratio of the input light. The eyepiece 160 may be additionally configured to focus the wide-field image onto the user's eye. For details on an example anamorphic eyepiece, see U.S. patent application Ser. No. 12/950,143, now U.S. Pat. No. 8,736,967, entitled "Anamorphic Eyepiece", which is incorporated herein by reference.

Figure 3:
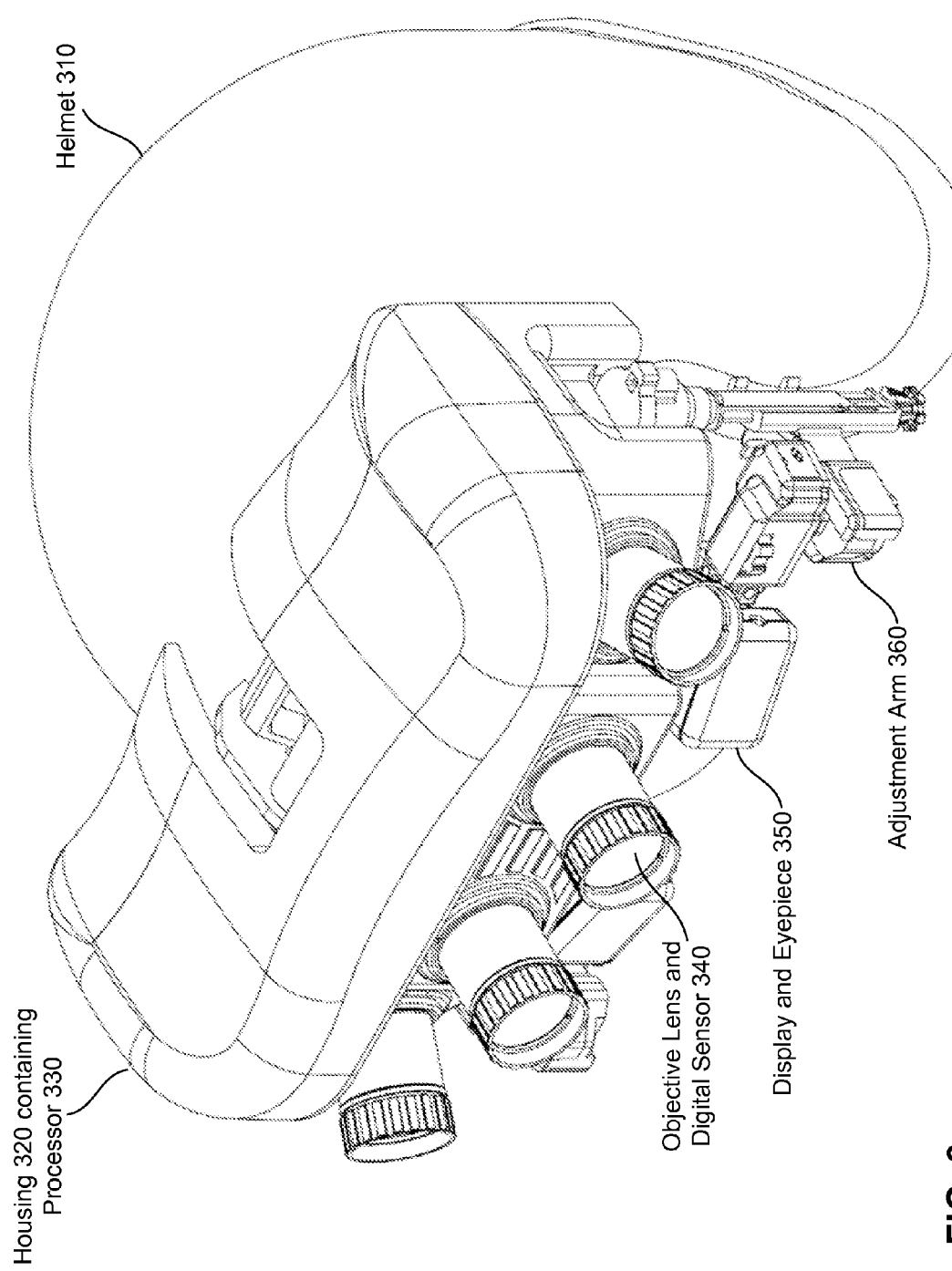
FIG. 3 is a perspective view of a high resolution wide field of view digital night vision system.

FIG. 3 is a perspective view of a high resolution wide field of view digital night vision system. In the example of FIG. 3, the night vision system 100 is attached to a helmet 310. The example embodiment of FIGS. 3 and 4 is designed for use by pilots, in that it minimizes the forward projection of the system, has a neutral center of gravity, is ejection safe, allows the user increased visibility of the field of view around the night vision field of view, and allows the user to selectively retract one or both night vision displays 350 to increase the non-night vision field of view.

The night vision system 100 may be attached to the helmet 310 using an attachment interface. One example of an attachment interface is a banana clip mount. The processor 330 of the night vision system 100 is protected by a housing 320. The objective lenses and digital sensors 340 are spaced apart and angled away from each other in manner similar to the example embodiment of FIG. 2. The objective lenses and digital sensors 340 and are located above the user's eye line on the forehead portion of the helmet 310. In this embodiment, four digital sensors 340 create a high resolution, wide field of view night vision image that is projected towards the user's eyes through two displays and eyepieces 350. The displays and eyepieces 350 are located at the ends of two separate adjustment arms 360. The adjustment arms 360 can be separately adjusted by the user to move a display and eyepiece 350 away from the user's eye to increase the user's non-night vision field of view.

The night vision system may also be used in applications that are not helmet mounted. Weapons sights, sights for non-weapons, electronic binoculars and telescopes (i.e., those which capture an image and then redisplay it), viewfinders for camcorders or other devices, and personal display systems (i.e., a device that projects images directly into the user's eye) are some examples.

Generally, in a night vision system 100 there will be a small amount of vertical displacement between the location of the digital sensors 340 and the location of the user's eyes. It is desirable to minimize the vertical displacement by placing the objective lens and digital sensor 340 as close, vertically, to the user's eyes as possible without obscuring the user's field of view. Generally, a small amount of vertical displacement will not affect the user when using the night vision system.

During use, the displays and eyepieces 350 are located a small distance from user's eyes. When both displays 350 are positioned in front of the user's eyes, the user has a night vision field of view of 80 degrees total through both eyes. Each adjustment arm 360 and the attached display and eyepiece 350 can be separately stowed by the user. By stowing a single adjustment arm, a user may continue to gain the benefit of night vision in one eye, while increasing their non-night vision field of view in the other. This may be useful, for example, when conducting airplane or helicopter night landings, where some night vision is desirable, but high levels of lighting in the surrounding environment make a normal vision field of view desirable as well. The adjustment arm may be stowed or moved into position by any number of mechanical devices. The adjustment arm may extend and collapse and rotate or pivot around one or more axes, or bend depending upon the embodiment.

FIG. 4a is a front view of a high resolution wide field of view digital night vision system. In the example of FIG. 4a, the adjustment arms 360 are deployed for use. The displays and eyepieces 350 are located very close to the digital sensors 340 in order to minimize the vertical displacement between the user's line of sight and the night vision image presented to the user. Additionally, the objective lenses and digital sensors 340 are horizontally aligned with the user's line of sight.

FIG. 4b is a top view of a high resolution wide field of view digital night vision system. In the example of FIG. 4b, one of the two adjustment arms 360 has been stowed to the side of the helmet 310. The other adjustment arm 360 is not visible, as it is deployed and therefore obscured by the housing 320 and the remainder of the night vision system 100.

The top view of the high resolution wide field of view digital night vision system illustrates the forward projection of the night vision system. For any head mounted system, night vision or otherwise, forward projection is the distance from the center of the user's head to the furthest outcropping of any portion of the head mounted system. When rotated through the angle that the user's head can turn, this forward projection is sometimes referred to as swept volume. In one embodiment, the night vision system 100 has a forward projection of 8.2 inches regardless of whether the adjustment arms are deployed or stowed. In another embodiment, the system has a forward projection of 8.5 inches. Traditional night vision systems can have a forward projection of 9.9 inches or greater. By keeping the weight low and reducing the forward projection, a night vision system, such as the example in FIG. 4b, may be constructed to have an ejection safe center of gravity.

FIG. 4c is a side view of a high resolution wide field of view digital night vision system. In the example of FIG. 4c, the adjustment arms 360 are deployed for use.

Table 1 below describes additional feature information related to several example embodiments of the night vision system 100. These are merely examples, however, and thus the system may vary from the examples below.

TABLE 1

HRVNS Feature Information

| Feature | Example Embodiment 1 | Example Embodiment 2 | Example Embodiment 3 |
|---|---|---|---|
| Field of View | 82.5 × 30 deg | 80 × 30 deg | 90 × 40 deg |
| Overlap | 27.5 deg | 30 deg | 30 deg |
| On-axis Exit Pupil Diameter | 12 mm | 12 mm | 15 mm |
| Off-axis Exit Pupil Diameter | 7 mm | 7 mm | 12 mm |
| Eye Relief | 25 mm | 25 mm | 30 mm |
| Weight (w/mount) | <5# head supported weight (HSW) | <5# head supported weight (HSW) | <4.5# head supported weight (HSW) |
| Interpupillary Distance Range | 52-80 mm | 57-71 mm | 55-75 mm |
| Fore/Aft Adjustment Range | 36 mm | 30 mm | 36 mm |
| Vertical Adjustment Range | 35 mm | 16 mm | 35 mm |
| Eyepiece Focus | −0.75 D | −0.75 D | −0.75 D |
| System Resolution/ Modulation Transfer Function (Quarter Moon) | 1.15 cy/mr on axis (20/30 Snellen) | 1.15 cy/mr on axis (20/30 Snellen) | 1.3 cy/mr on axis (20/26 Snellen) |
| Center of Gravity | Ejection Safe | Ejection Safe | Ejection Safe |
| Halo Diameter | 0.7 mm | 0.7 mm | 0.0 mm |
| Distortion | <3.0% | <3.0% | <1.0% |
| Battery Power | A/C Powered | 10 hours primary and secondary | 12 hours primary and secondary |
| Objective Focus Range | 36" to infinity | 36" to infinity | 12" to infinity |
| Filtering | Unfiltered, with attachable filters | Unfiltered, with attachable filters | Unfiltered, with attachable filters |

Terms such as "optical" or "light" are not intended to be limited to any one specific wavelength range. Nor are they meant to be limited to the visible region of the electromagnetic spectrum.

Some embodiments may be described using the expression "coupled" or "connected." It should be understood that these terms are not intended as synonyms for each other. The term "connected" indicates that the connected elements are in direct physical, electrical, or optical contact with each other. The term "coupled" includes the case where the coupled elements are in direct physical, optical, or electrical contact but it also includes the case where the coupled elements are not in direct contact with each other, but still co-operate or interact with each other. In particular, there may be intervening elements.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A head-mounted night vision system comprising:
   a housing configured to be mounted on a user's head above the user's eyes;
   a left digital night vision image sensor, a center digital night vision image sensor, and a right digital night vision image sensor, each digital sensor being in the housing, each digital sensor comprising a resolution of at least 1600×1200 pixels, the digital sensors directly and simultaneously receiving unamplified low intensity ambient input light comprising wavelengths in the visible to near infrared range of approximately 390 nanometers to 1100 nanometers, each of the digital sensors producing a different visible digital image using the ambient input light received by that digital sensor, the ambient light used to form the image including light in the visible to near infrared range of approximately 390 nanometers to 1100 nanometers received by that digital sensor;
   a processor that receives the simultaneously captured digital images from the digital night vision image sensors and processes the simultaneously captured digital images to produce a left wide-field image from the left and center digital night vision image sensors and to produce a right image from the right night vision image sensor, said processing comprising digitally stitching together the simultaneously captured digital images to create the left wide-field image comprising a visible portion spanning at least 50 degrees of the user's horizontal view such that the left wide-field image and the right image together span at least 60 degrees of the user's horizontal field of view;

a left display and left eyepiece, the left display receiving and displaying the left wide-field image, and the left eyepiece disposed to receive light from the display such that said light propagates to the user's left eye such that the user's left eye can view said left wide-field image;

a right display and right eyepiece, the right display receiving and displaying the right image, and the right eyepiece disposed to receive light from the display such that said light propagates to the user's right eye such that the user's right eye can view said right image;

a left objective at the front of the housing, the left objective receiving unamplified low intensity ambient input light and providing the unamplified low intensity light to the left digital night vision image sensor;

a center objective at the front of the housing, the center objective receiving unamplified low intensity ambient input light and providing the unamplified low intensity light to the center digital night vision image sensor; and a right objective at the front of the housing, the right objective receiving unamplified low intensity ambient input light and providing the unamplified low intensity light to the right digital night vision image sensor, wherein the left and center objectives have fields of view sufficiently large that the left and center digital night vision image sensors capture partially overlapping portions of the user's horizontal field of view, wherein the left and right objectives are angled away from each other and are angled away from the center objective such that the left, center, and right digital night vision image sensors capture substantially non-overlapping portions of the user's horizontal field of view, wherein the right-eye objective faces a rightward direction that is angled to the user's right in comparison to the outward direction which the right eyepiece faces, wherein the left-eye objective faces a leftward direction that is angled to the user's left in comparison to the outward direction which the left eyepiece faces, and wherein the objectives and sensors are arranged such that night vision system has a forward projection of less than 8.5 inches.

2. The head-mounted night vision system of claim 1 further comprising:

an adjustable arm attached to the housing and holding the left display and left eyepiece, the adjustable arm moveable to (a) a first position where the left eyepiece is out of the user's line of sight for the user's left eye so that the left wide-field image is not viewable by the user's left eye, and (b) a second position where the left eyepiece is in the user's line of sight for the user's left eye so that the left wide-field image is viewable by the user's left eye.

3. The head-mounted night vision system of claim 2 wherein the head-mounted night vision system has an ejection safe center of gravity.

4. The head-mounted night vision system of claim 2 wherein the processor is disposed within the housing.

5. The head-mounted night vision system of claim 2 wherein the head-mounted night vision system has an ejection safe weight.

6. The head-mounted night vision system of claim 1 wherein the left wide-field image and the right image each span at least 30 degrees of a user's vertical field of view.

7. The head-mounted night vision system of claim 1 wherein the processor removes distortion from the wide-field image.

8. The head-mounted night vision system of claim 1 wherein the processor combines an overlay digital image with the digital image(s) from the digital night vision image sensors to produce the wide-field image.

9. The head-mounted night vision system of claim 1 wherein the left display has a resolution of at least 2560× 1024 pixels.

10. A head-mounted night vision system comprising:

two left-eye and two right-eye digital night vision image sensors, the digital sensors directly and simultaneously receiving unamplified low intensity ambient input light to form respective digital images, the ambient light used to form the images including light comprising at least one wavelength in the visible to near infrared range of approximately 390 to 1100 nanometers, each of the digital sensors producing a different visible digital image using the ambient input light received by that digital sensor, each of the digital sensors capturing at least 27.5 degrees of a user's horizontal field of view;

a processor that receives the simultaneously captured digital images from the digital night vision image sensors and processes the simultaneously captured digital images to produce a left wide-field image associated with the two left-eye digital sensors and a right wide-field image associated with the two right-eye digital sensors, said processing comprising digitally combining the simultaneously captured digital images to create the left wide-field image and the right wide-field image each comprising a visible portion spanning at least approximately 55 degrees of the user's horizontal field of view, wherein the left wide-field image and the right wide-field image horizontally overlap by at least 27.5 degrees such that the left wide-field image and the right image together span at least 60 degrees of the user's horizontal field of view;

two left-eye objectives, each of which provides unamplified low intensity ambient input light to a respective one of the two left-eye digital sensors, wherein one of the left-eye objectives faces a leftward direction that is angled towards the user's left and wherein one of the left-eye objectives is substantially aligned with the user's forward view;

two right-eye objectives, each of which provides unamplified low intensity ambient input light to a respective one of the two right-eye digital sensors, wherein one of the right-eye objectives faces a rightward direction that is angled towards the user's right and wherein one of the right-eye objectives is substantially aligned with the user's forward view;

left and right displays and associated left and right eyepieces, the left display receiving and displaying the left wide-field image, the left eyepiece disposed to receive light from the display such that said light propagates to the user's left eye such that the user's left eye can view said left wide-field image, the right display receiving and displaying the right wide-field image, the right eyepiece disposed to receive light from the display such that said light propagates to the user's right eye such that the user's right eye can view said right wide-field image; and at least one adjustable arm, each adjustable arm holding at least one of the eyepieces, each adjustable arm moveable to (a) a first position where the held eyepiece(s) is out of the user's line of sight so that the wide-field image(s) associated with the held eyepiece(s) is not viewed by the user's eye(s) associated with the held eyepiece(s), and (b) a second position where the eyepiece(s) is in the user's line of sight so that the wide-field image(s) associated with the held eyepiece(s) can be viewed by the user's eye(s) associated with the held eyepiece(s).

11. The head-mounted night vision system of claim 2 wherein the head attachment apparatus comprises:
an additional adjustable arm attached to the attachment interface and holding the right display and right eyepiece, the additional adjustable arm moveable to (a) a first position where the right eyepiece is out of the user's line of sight for the user's right eye so that the right image is not viewable by the user's right eye, and (b) a second position where the right eyepiece is in the user's line of sight for the user's right eye so that the right image is viewable by the user's right eye.

12. The head-mounted night vision system of claim 1 wherein the center objective and the center digital sensor comprise a center-left objective and a center-left digital sensor, the night vision subsystem further comprising:
a center-right digital night vision image sensor comprising a resolution of at least 1600×1200 pixels, receiving unamplified low intensity ambient input light comprising wavelengths in the visible to near infrared range of approximately 390 nanometers to 1100 nanometers, producing a visible digital image using the ambient input light, the ambient light used to form the image including light in the visible to near infrared range of approximately 390 nanometers to 1100 nanometers received by the center-right digital sensor, wherein the processor digitally stitches together digital images from the center-right and right digital sensors to create the right image, wherein the right image comprises a visible portion spanning at least 50 degrees of the user's horizontal field of view; and
a center-right objective at the front of the housing, the center-right objective receiving unamplified low intensity ambient input light and providing the unamplified low intensity light to the center-right digital night vision image sensor, wherein the right and center-right objectives have field of views sufficiently large that the right and center-right digital night vision image sensors capture partially overlapping portions of the user's horizontal field of view.

13. The head-mounted night vision system of claim 1 wherein the head-mounted night vision system has a safe weight.

14. A night vision system, comprising:
a left-eye objective;
a center objective;
a right-eye objective,
wherein the center objective is substantially aligned with a user's forward view;
wherein the left-eye objective is angled horizontally left of the user's forward view; and
wherein the right-eye objective is angled horizontally right of the user's forward view;
a left-eye digital night vision image sensor that receives unamplified low intensity ambient input light from the left-eye objective;
a center digital night vision image sensor that receives unamplified low intensity ambient input light from the center objective;
a right-eye digital night vision image sensor that receives unamplified low intensity ambient input light from the right-eye objective,
wherein each digital sensor has a resolution of at least 1600×1200 pixels,
wherein each digital sensor is sensitive to unamplified low intensity ambient input light in the visible to near infrared range of approximately 390 nanometers to 1100 nanometers; and
wherein the left-eye, center, and right-eye digital night vision image sensors capture substantially non-overlapping portions of the user's forward field of view;
a processor that receives digital images from the digital night vision image sensors and digitally stitches digital images together into a left-eye wide-field image and a right-eye wide-field image;
a left-eye display and a left-eye eyepiece, the left-eye display receiving and displaying the left-eye wide-field image and the left-eye eyepiece receiving light from the left-eye display and propagating the light to the user's left eye such that the user's left eye can view the left-eye wide-field image; and
a right-eye display and a right-eye eyepiece, the right-eye display receiving and displaying the right-eye wide-field image and the right-eye eyepiece receiving light from the right-eye display and propagating the light to the user's right eye such that the user's right eye can view the right-eye wide-field image,
wherein the left-eye objective is angled horizontally left of the outward direction that the left-eye eyepiece is facing and the right-eye objective is angled horizontally right of the outward direction that the right-eye eyepiece is facing.

15. The night vision system defined in claim 14, wherein the left-eye and right-eye wide field images together span at least 60 degrees of the user's horizontal field of view.

16. The night vision system defined in claim 14, wherein the objectives and sensors are vertically offset from the left-eye and right-eye eyepieces such that the objectives and sensors do not vertically overlap the left-eye and right-eye eyepieces.

17. The night vision system defined in claim 14, wherein the rightmost edge of the left-eye objective is disposed laterally to the left of the leftmost edge of the left-eye eyepiece and wherein the leftmost edge of the right-eye objective is disposed laterally to the right of the rightmost edge of the right-eye eyepiece.

18. The night vision system defined in claim 14, wherein the left-eye and right-eye eyepieces are substantially vertically aligned with the user's eye line, wherein each of the objectives has a maximum optical diameter, and wherein each of the objectives is vertically offset from the user's eye line by at least the maximum optical diameter of that objective.

19. The night vision system defined in claim 14, wherein the left-eye and right-eye eyepieces each have a center and a vertical height, wherein each of the objectives has a center and a vertical height, and wherein the centers of the objectives are offset vertically above the centers of the eyepieces by distances greater than the vertical heights of the eyepieces and the vertical heights of the objectives.

20. The night vision system defined in claim 14, wherein the left-eye and right-eye eyepieces each have a front face facing away from the user's eyes, a back face facing towards the user's eyes, and four sides and wherein one of the sides pivots about an axis such that the other three sides can be moved with respect to the objectives.

21. The night vision system defined in claim 14, wherein the left-eye and center objectives have fields of view sufficiently large that the left-eye and center digital night vision image sensors capture partially overlapping portions of the user's horizontal field of view and wherein the right-eye and center objectives have fields of view sufficiently large that the right-eye and center digital night vision image sensors capture partially overlapping portions of the user's horizontal field of view.

22. The night vision system defined in claim 14, wherein the center objective and the center digital sensor comprise a center-left objective and a center-left digital sensor, the night vision system further comprising:

a center-right objective, substantially aligned with the user's forward view; and a center-right digital night vision image sensor that receives unamplified low intensity ambient input light from the center-right objective, wherein the center-right digital sensor has a resolution of at least 1600×1200 pixels and is sensitive to unamplified low intensity ambient input light in the visible to near infrared range of approximately 390 nanometers to 1100 nanometers, and wherein the processor receives digital images from the center-right digital night vision image sensor, digitally stitches the digital images from the right and center-right digital sensors together into the right-eye wide-field image, and digitally stitches the digital images from the left and center-left digital sensors together into the left-eye wide-field image.

* * * * *